United States Patent [19]

Winter et al.

[11] Patent Number: 4,550,247
[45] Date of Patent: Oct. 29, 1985

[54] OPTICAL SCANNING READER SYSTEM FOR LOADING COMPUTERS

[75] Inventors: Arthur J. Winter, Encino, Calif.; Rodney L. Larson, Minnetonka, Minn.

[73] Assignee: Databar Corporation, Eden Prairie, Minn.

[21] Appl. No.: 570,674

[22] Filed: Jan. 13, 1984

[51] Int. Cl.[4] .............................................. G06K 7/10
[52] U.S. Cl. .................................................. 235/472
[58] Field of Search ....................................... 235/472

[56] References Cited

U.S. PATENT DOCUMENTS 3,238,501  3/1966  Mak et al. ............................ 235/472

Primary Examiner—Harold I. Pitts
Attorney, Agent, or Firm—Peterson, Wilks, Nemer & Wamrath

[57] ABSTRACT

Computer programs or other informational data are recorded on one or more sheets in the form of lines of optical bar code. At least one Control Array line containing characters which define the format for the program or other informational data to be transmitted to a specific digital computer is included in the optical bar code in addition to the data lines which contain characters representing the particular program of other information. A bar code scanner scans the lines of optical bar code and converts the scanned marks and spaces of the optical bar code into digital data representative of the characters in the line which is scanned. The digital data from the Control Array line is stored as Control Array data, and the digital data from one or more data lines are stored as program or informational data. After a predetermined amount of program or informational data has been stored, the scanner transmits the stored program or informational data to the digital computer in a format which is based upon the stored Control Array data.

19 Claims, 15 Drawing Figures

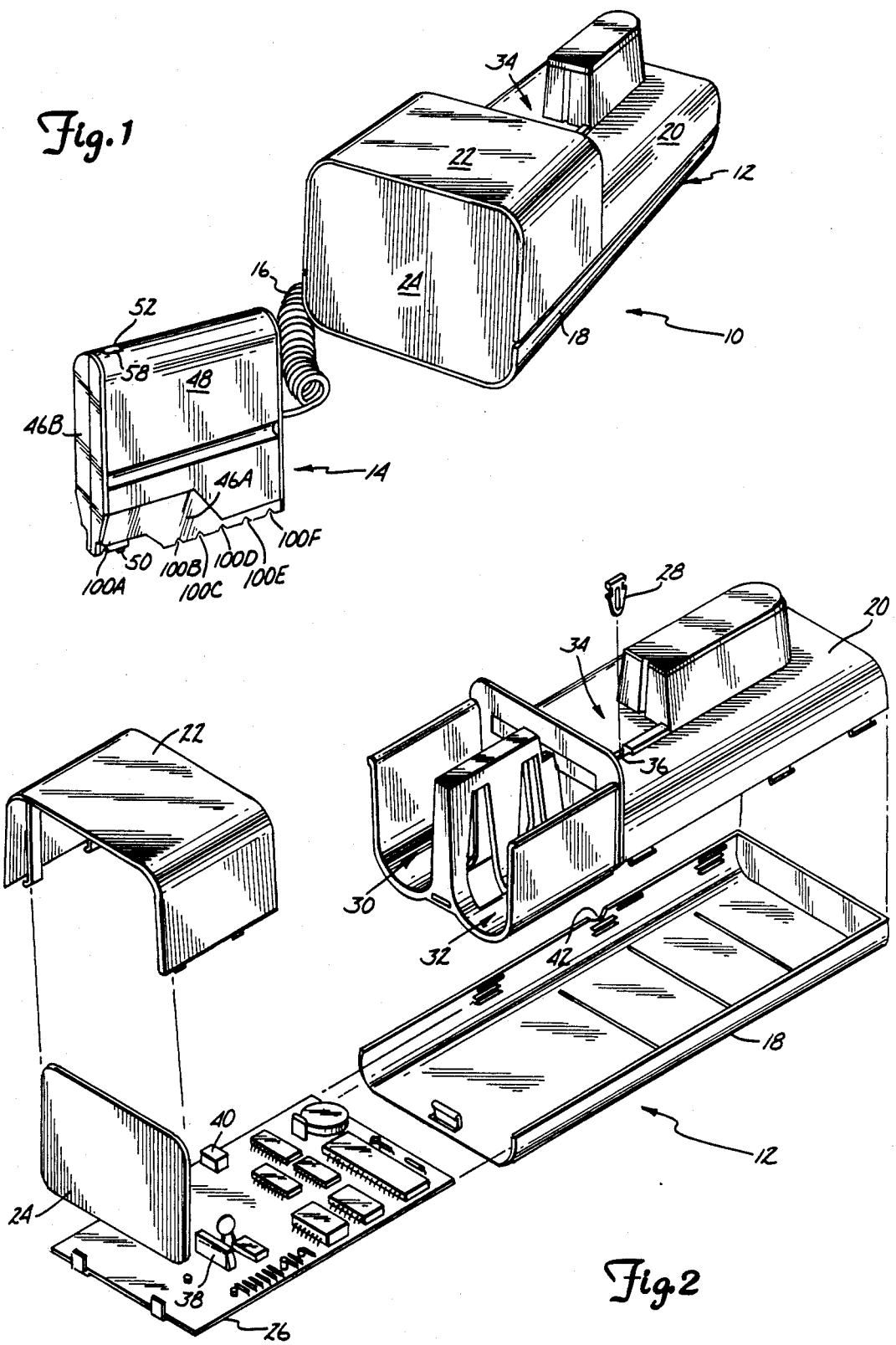

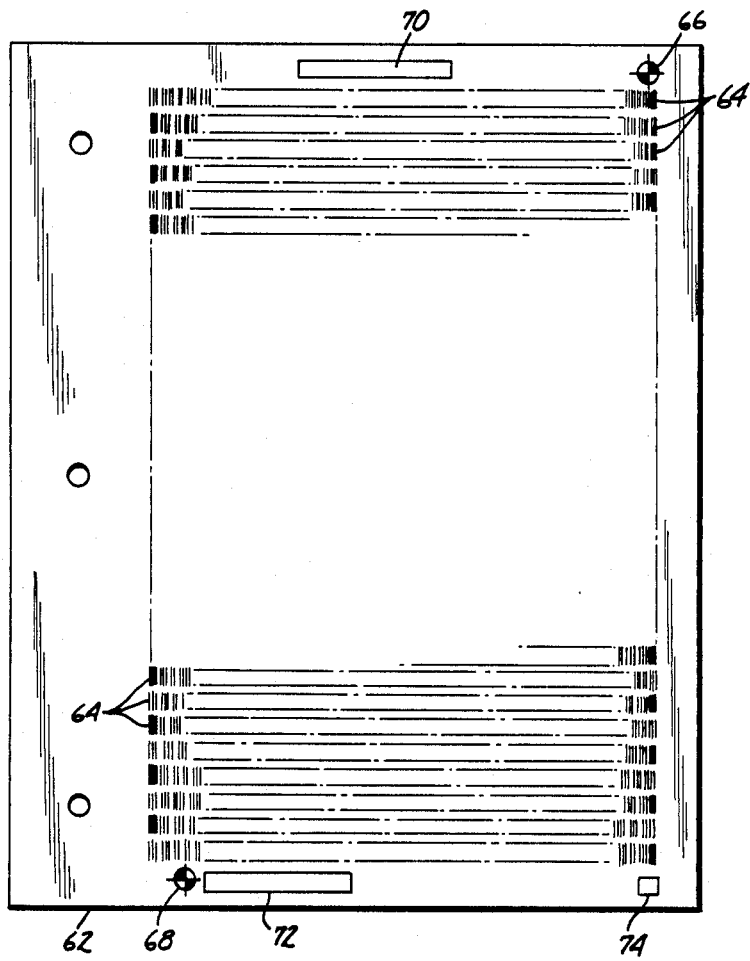
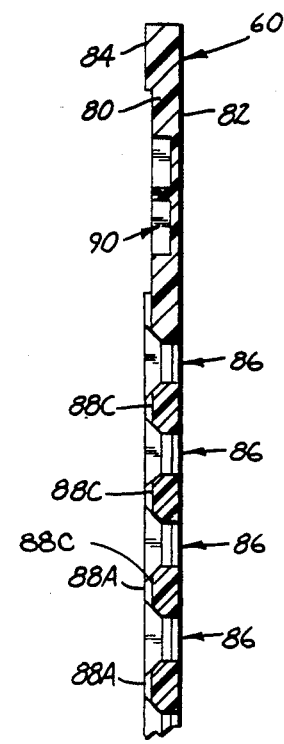
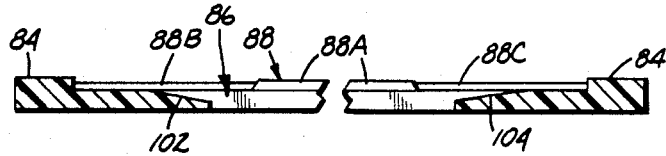
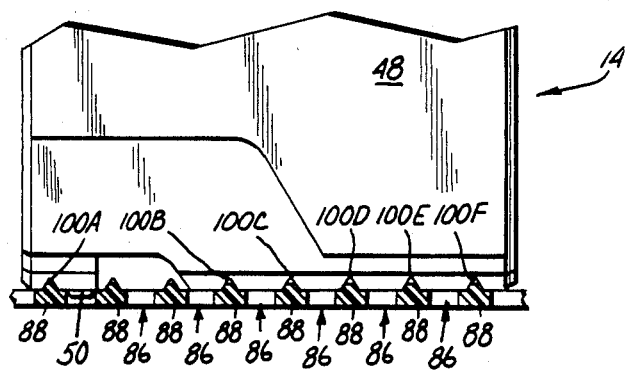

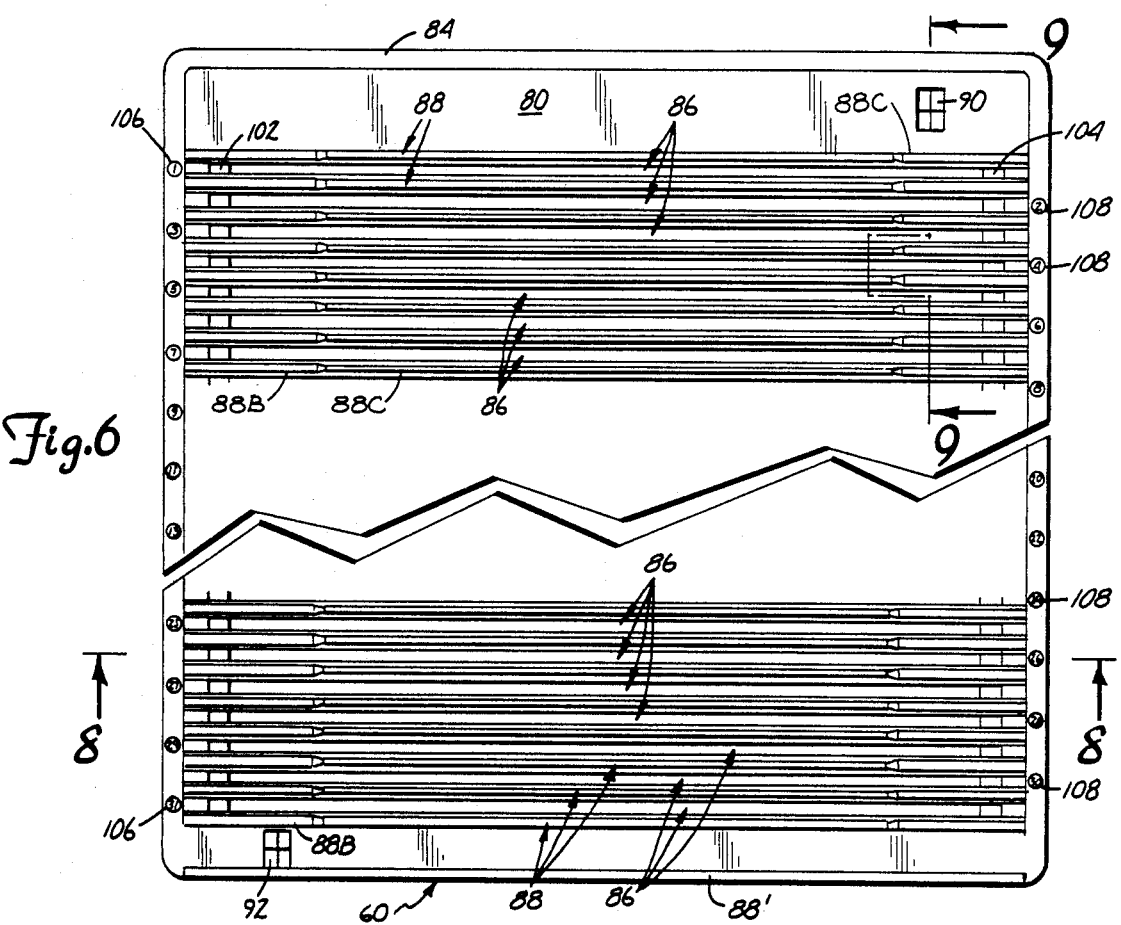
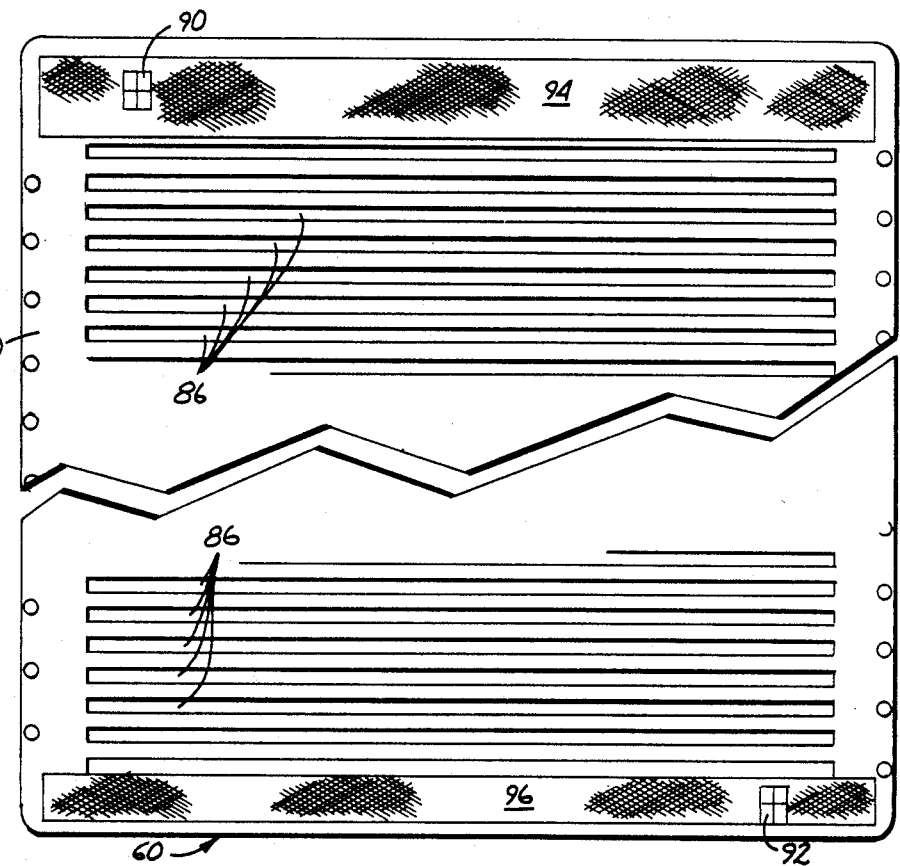

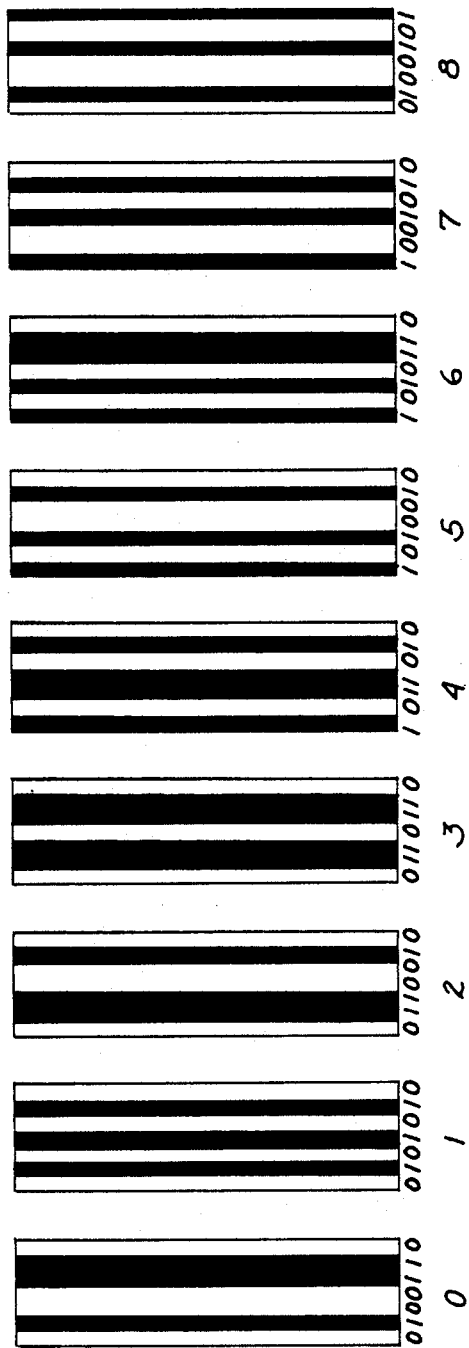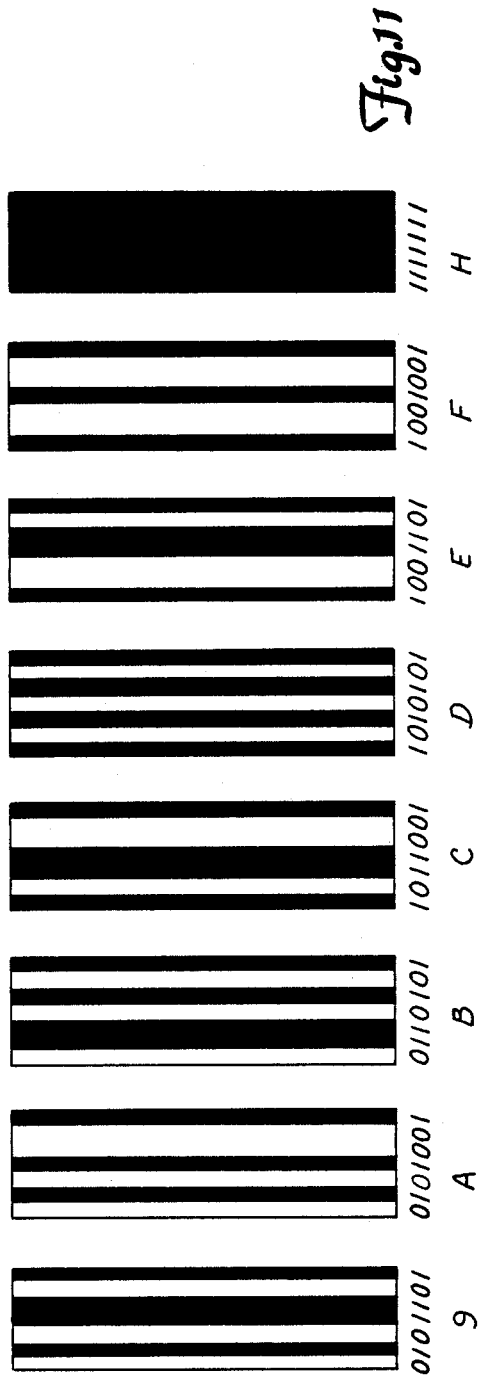
Fig.11

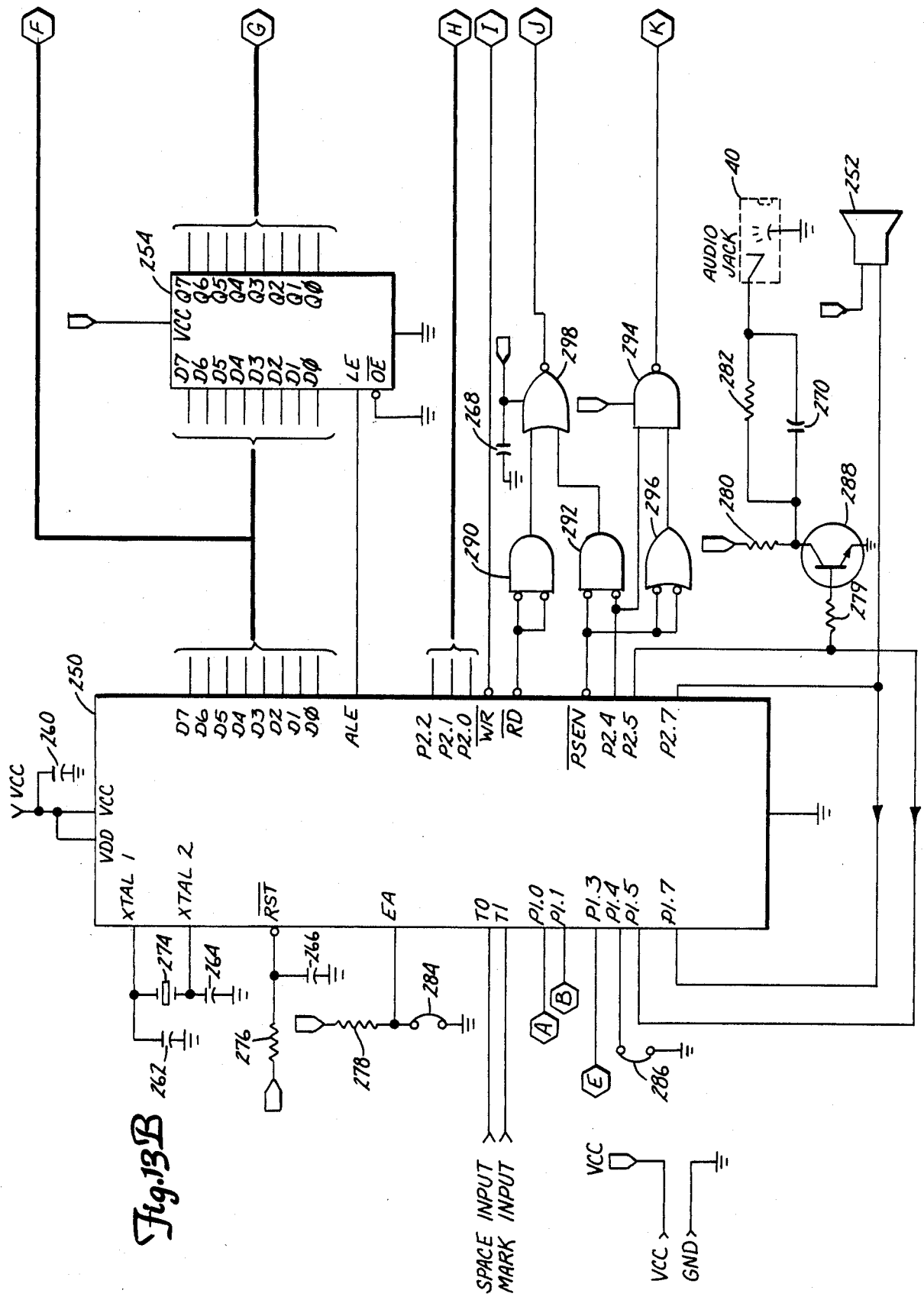

OPTICAL SCANNING READER SYSTEM FOR LOADING COMPUTERS

CROSS-REFERENCE TO RELATED APPLICATIONS

The following copending applications contain subject matter related to this application:

"Self-synchronized Optical Bar Code Reading System", Ser. No. 569,990, filed on Jan. 11, 1984.

"System and Method for Guiding a Hand-held Optical Bar Code Reader", Ser. No. 570,678, filed on Jan. 13, 1984.

"System for Reading an Optical Bar Code", Ser. No. 570,673, filed on Jan. 13, 1984.

"Optical Bar Code", Ser. No. 569,989, filed on Jan. 11, 1984.

"Battery-Powered Optical Bar Code Reader and Voltage Regulator Therefor", Ser. No. 580,677, filed on Jan. 13, 1984.

BACKGROUND OF THE INVENTION

1. Field of the Invention

The present invention relates to an optical system for loading information into computers, and pertains more particularly to a system utilizing a bar code in which at least one line thereof constitutes a Control Array line containing characters identifying the computer for which the program or data set has been written and at least one data line containing characters representing the information to be transmitted to the computer.

2. Description of the Prior Art

Over the past decade, significant advances in solid state technology and digital electronics have permitted the development of low cost digital computers which are used in an ever increasing number of industrial and consumer products. One segment of the computer industry which has grown rapidly in recent years is the "home computer" market which encompasses those digital computers which are used, for the most part, for personal rather than commercial applications and which are affordable to a large segment of the consuming public.

With the rapid growth of the computer market, there has been an accompanying growth in the computer software industry which provides computer programs usable with various computers. The number of programs available for most popular home computer models, for instance, has grown at an extremely rapid rate.

There are a number of ways in which a computer user can obtain a new program. First, the user can write the program himself. In many cases, however, this is not practical or desirable because the user either lacks the time or skill to write such a program, or because the program is already commercially available.

Second, the program may be printed in a computer magazine or book. In that case, the user normally has to enter the program through the keyboard of the computer. For many programs, this is a very time-consuming task and is very prone to errors.

Third, many programs are available to computer users in prerecorded form, either on magnetic tape cassettes, or on floppy disks. The tape cassette requires, of course, that the computer user have a tape recorder which can be used to play the cassette and supply signals to the computer through the cassette input port. In the case of the floppy disk, the computer user must have a floppy disk drive in order to transfer the program from the disk to the computer.

Another known way in which information can be stored is in the form of optical bar codes. At the present time, bar codes are used extensively in many fields to store information on products, packages and labels which can be read by machine and provided to a computer. One well-known example is the Uniform Product Code (UPC) which is found on most packages sold in grocery stores. The UPC bar code is read by a scanning system at the checkout counter, and a computer automatically determines the price of the product and provides a cash register receipt listing the product name and price. This eliminates the time-consuming and error prone manual checkout procedure which had been used for many years in grocery stores.

An optical bar code consists of a specific number of what have heretofore been referred to as light elements, modules or pixels, and which herein will be called "cells". Each cell is in the form of either a dark bar ("mark") or a light bar ("space"), the various dark and light bars being arranged parallel to one another. A "mark" represents a "1" and a "space" represents a "0". The bar code data is read by relative movement of the bar code with respect to an optical reader in a direction which is perpendicular to the marks and spaces.

The prerecording of computer programs or data on a printed sheet in the form of lines of optical bar code data is attractive, since it is well suited to mass production techniques, and can conveniently be distributed in magazine and book form. In recording computer information in the form of multiple lines of bar code on printed sheets, it is important to maximize the amount of data stored on a single sheet, so that an entire program or data set can be recorded on a single sheet or on a relatively small number of sheets. The bar codes and bar code readers used in the past, however, have had a much lower data density than is desirable for recording computer programs.

A typical prior art optical bar code uses nine cells to record four bits of information. Each four-bit "character" or "nibble" begins with a "mark", a "space", and a "mark" of single width (i.e. binary 101). The remaining six cells are used to designate the four bits of data. In reading the code, the reader must be capable of distinguishing between a single-cell bar containing a single "mark" and a double-cell bar containing two "marks" which are adjacent one another. Similarly, the reader must be able to distinguish between a single bar containing a single "space" and a double bar containing two "spaces" which are adjacent one another. The prior art code uses the "space" between two "marks" (i.e. binary 101) at the beginning of each character to obtain a timing value for a single-cell bar. This timing value is then compared to the time duration of each subsequent "mark" or "space" bar in the character to distinguish between single and double bars.

There is a need for an improved system for loading prerecorded computer programs or data into a digital computer, one that is both simple and reliable. This is achieved with a specially prepared bar code and the manner in which such data is scanned and processed, and transmitted to specific computers.

SUMMARY OF THE INVENTION

The present invention relates to a system for loading computer information into a digital computer in which the programs or data are prerecorded in the form of lines of optical bar code that have been printed on a carrier, such as one or more sheets of paper. The printed lines of optical bar code are scanned, and the particular computer information represented by the various lines of optical bar code are transmitted to the computer after being converted to corresponding digital values.

The plurality of lines of optical bar code include at least one Control Array line and at least one data line. The Control Array line represents data which defines the format of the data to be transmitted to the digital computer. The data lines represent the information data to be transmitted.

A bar code scanner employing a hand-held reader scans the lines of optical bar code, stores the Control Array data and information data, and then transmits the information data based upon a format defined by the Control Array data. The scanning system includes means for providing an output representative of mark and space bars of each line of optical bar code. The scanning system not only includes means for converting the output for each line of individual data representative of the characters in that line, but additionally includes means for storing the digital data from the control array line as the Control Array data and means for storing the digital data from the data lines as the information data. The bar code scanning system transmits the stored information data to the digital computer in the specific format defined by the stored Control Array data.

In one form of the present invention, each line of optical bar code begins with a predetermined start-of-line character and ends with a predetermined end-of-line character. The means for converting the sensed output signal, which is in analog form, to digital data does not begin its conversion step until the output or sensed signal has changed in a first predetermined manner that is indicative of a start-of-line character. When the output signal changes in a second predetermined manner that is indicative of an end-of-line character, the means for converting discontinues any further converting of the output to digital data until the output again changes in the first predetermined manner which indicates the presence of another start-of-line character.

Each line of optical bar code also includes a line number (which permits the bar code scanner to verify that the lines of bar code are being read in the proper sequence) and a checksum character or byte (which, when added to all the other data from the line, results in a predetermined value). If the predetermined value is not obtained, the bar code scanning system provides a warning signal to the user indicating that the line of optical bar code was not correctly read.

The Control Array data represented by the control array line provides the data necessary to permit the bar code scanning system to emulate an input device or terminal for the particular digital computer for which the information has been written.

BRIEF DESCRIPTION OF THE DRAWINGS

FIG. 1 is a perspective view showing a control unit and a hand-held reader employed in the reading system of the present invention;

FIG. 2 is an exploded perspective view of the control unit of FIG. 1;

FIG. 5 is a top view of the underlying sheet of FIG. 4, the sheet having a number of lines of optical bar code printed thereon;

FIG. 6 is a top view of the template, the upper edge thereof spatially corresponding to the left edge as viewed in FIG. 4;

FIG. 7 is a bottom view of the template;

FIG. 8 is a sectional view taken in the direction of line 8—8 of FIG. 6 but with a center portion broken away;

FIG. 9 is a sectional view taken in the direction of line 9—9 of FIG. 6;

FIG. 10 is a fragmentary side view of the lower portion of the reader, the view being taken in the direction of line 10—10 of FIG. 4 so that a portion of the template is sectionally included;

FIG. 11 is a diagram showing a seven-cell optical bar code used with the self-synchronizing reader system of the present invention and in which each seven cells represent a hexadecimal character;

DETAILED DESCRIPTION OF THE PREFERRED EMBODIMENT

Figure 3:
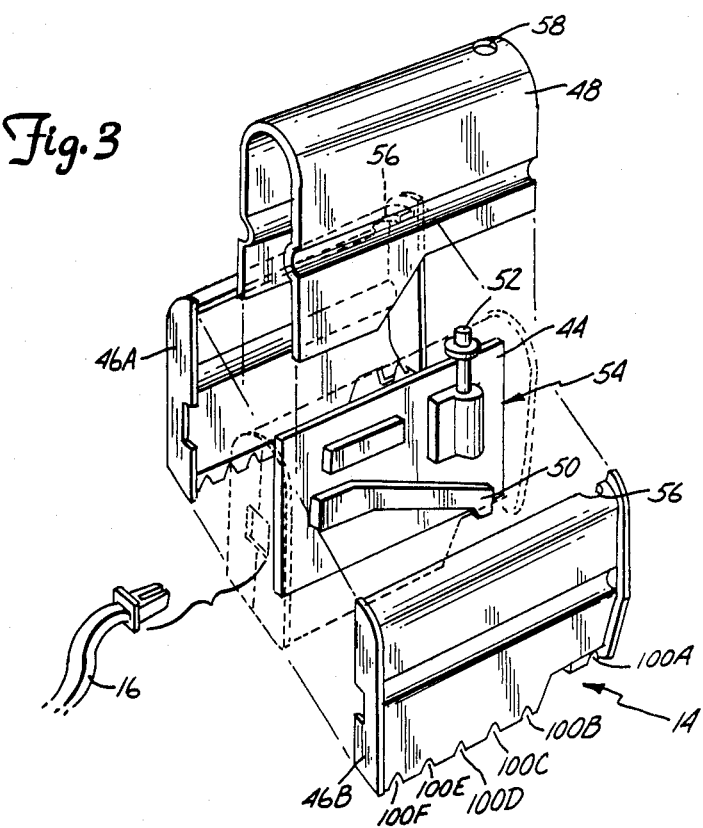
FIG. 3 is an exploded perspective view of the reader of FIG. 1, the view being on a somewhat larger scale and taken from the opposite side.

1. Bar Code Scanner 10 (FIG. 1)

FIG. 1 shows a low cost, reliable bar code scanner 10, which possesses special utility as an input device for loading computer programs or data into a computer (not shown). The information to be loaded is recorded in the form of lines of optical bar code data on one or more sheets of paper. The bar code scanner 10 includes a control unit 12 and a hand-held reader 14, the two of which are interconnected by a coiled cable 16. The user of the bar code scanner 10 reads the bar code recorded information by manually propelling the hand-held reader 14 along the various data lines constituting the optical bar code. More specifically, the hand-held reader 14 senses the light spaces and dark bars of the bar code and translates the sensed light spaces and dark bars into a pulsating analog signal, the time duration of the peaks and valleys of which is indicative of the bar code data and which signal is supplied to the control unit 12.

2. Control Unit 12 (FIG. 2)

The control unit 12 decodes the incoming signal pulses from the hand-held reader 14 into appropriate byte information. Several lines of byte information are stored by the control unit 12 (depending upon the particular type of computer). When the appropriate amount of byte information has been stored, the control unit 12 transfers that information to the computer (such as a home computer) through an input/output port of the computer (such as a cassette port or RS232 interface). The control unit 12 functionally emulates the device (such as a cassette player) which would normally be connected to the computer input.

As shown in FIG. 2, the control unit 12 includes a housing base 18, an upper housing 20, a housing cover 22, an access cover 24, a printed circuit board 26, and a power switch plunger 28. The control unit 12 is powered by a battery 29 shown in FIG. 13A comprised of four D cells, the cells being held in compartments 30 and 32 at the front end of the upper housing 20. The access cover 24 is removable to permit the removal and replacement of the cells contained in the compartments 30 and 32.

The upper housing 20 includes a cradle 34 for holding the reader 14 when it is not in use. The power switch plunger 28 extends through an opening 36 to engage a power switch 38 mounted on the printed circuit board 26. When the reader 14 is located in the cradle 34, the plunger 28 is depressed, and the switch 38 is off or open. When the reader 14 is removed from the cradle 34, the plunger 28 rises and the switch 38 closes. This causes power to be supplied to the digital circuitry (FIGS. 13A–13C) of the control unit 12, and also provides power through the cable 16 to the analog sensing circuitry (FIG. 12) of the reader 14.

An audio jack 40 projects through an aperture 42 in the housing base 18 and the upper housing 20 to permit connection of the control unit 12 to the computer by means of a cable (not shown) which extends between the audio jack 40 and the input port of the computer. As already explained, the computer is not illustrated.

3. Reader 14 (FIGS. 3 and 4)

Figure 4:
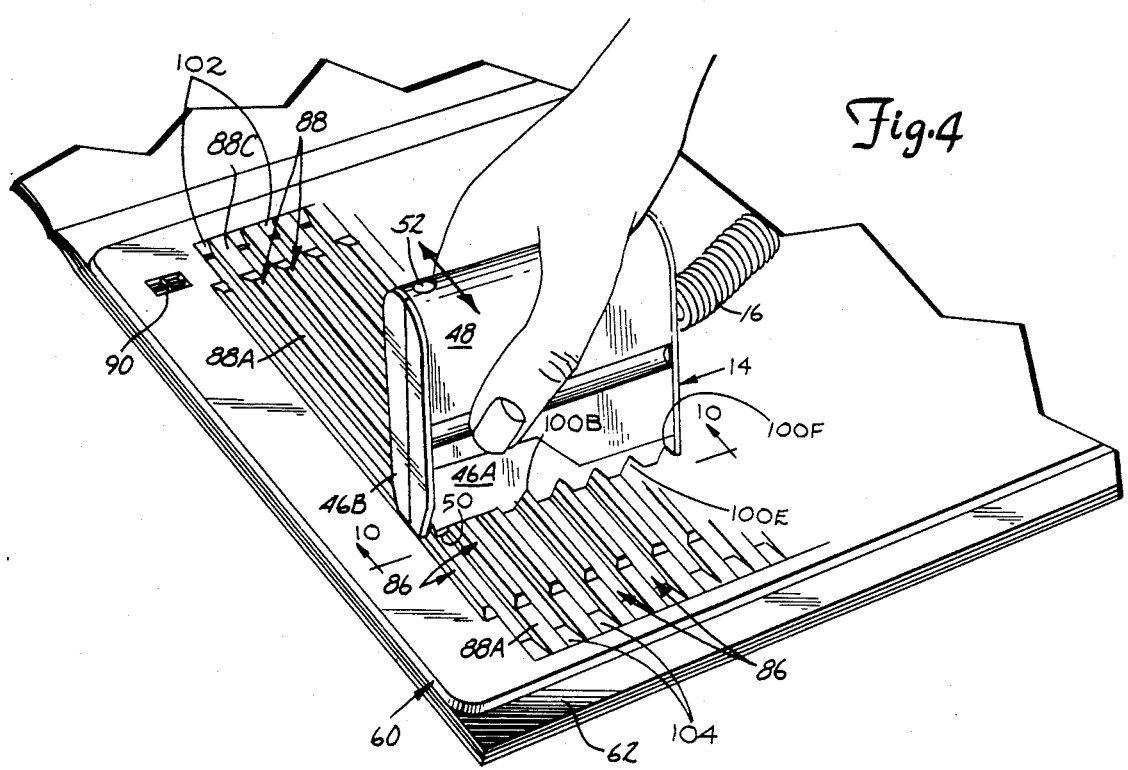
FIG. 4 is a perspective view showing the reader in use with a special template, the reader being oriented as in FIG. 1 and being hand-propelled across the template for the purpose of reading an optical bar code that has been printed on an underlying sheet.

FIG. 3 is an exploded view of the reader 14, which includes a printed circuit board 44, cover housings 46A and 46B, and a cover cap 48. The circuit board 44 carries and supports a fiber optic probe 50, a POWER ON indicator light 52, and analog circuitry at 54 (diagrammed in FIG. 12). The probe 50 directs light downwardly onto the bar code and collects light reflected from the bar code. The analog circuitry 54 converts the reflected light received by the probe 50 to an analog signal having a variable amplitude waveform. The printed circuit board 44 is mounted within the cover housings 46A and 46B, which are covered and held together by the cover cap 48. The probe 50 projects downwardly and has its tip exposed at the bottom of the cover housings 46A and 46B to direct light downwardly onto the sheet being scanned, and to receive refected light from the sheet. The POWER ON indicator light 52 extends upwardly from the printed circuit board 44 and its light can be viewed through an aperture 56 in the cover housings 46A and 46B and an aperture 58 in the top of the cover cap 48. When the reader 14 has been removed from the cradle 34 and power is being supplied from the control unit 12 to the reader 14, the POWER ON indicator light 52 is turned on.

In recording computer programs or data in the form of bar code data on printed sheets, it is important to maximize the amount of information stored on a single sheet. The need for high density recording requires that the individual bars must be as narrow as possible and closely spaced. This requirement, however, presents several important problems as far as the use of a conventional hand-held reader is concerned.

First, as the width (or height if the sheet is viewed vertically) of the bar code lines and the spacing between lines are decreased in order to increase the number of lines per sheet, it becomes increasingly difficult to move an ordinary reader along the line without inadvertently wandering to an adjacent line during scanning movement. This is aggravated by the natural tendency of a person to move a hand-held reader in an arc rather than along a straight line when the movement of such a reader is unguided. Second, the fluctuations in speed during unguided movement of a typical reader can interfere with the accurate sensing of bars of different widths.

In practicing the present invention, as will be understood from FIG. 4, the above problems are overcome by employing a special guide template 60, which overlies a data sheet labeled 62. The template 60 provides a guide for maintaining alignment of the hand-held reader 14 as it is moved along each of the lines of bar code contained on the sheet 62. The guiding provided by the template 60 not only ensures alignment of the reader 14 with a single line during movement from one end to another, but also aids the user in achieving a more uniform rate of movement of the reader 14 along the line.

4. Sheet 62 (FIG. 5)

FIG. 5 shows a paper sheet 62 having one bar code configuration printed thereon. In this embodiment, the sheet 62 includes a bar code containing thirty-one bar code lines 64, a pair of alignment marks 66 and 68, and printed information blocks 70, 72, and 74. The sheet 62 can be manufactured either as an individual unit, or as a page which is printed and distributed as part of a larger document, such as a computer user magazine. The information block 70 may contain a program and page number; the information block 72 may provide a magazine name and volume number, and the information block 74 can provide a magazine page number.

In the illustrated embodiment of the present invention, the bar code lines 64 are arranged so that the first line (the top line as viewed in FIG. 5) is read from left to right, the second line is read from right to left, the third line is read from left to right, and so on in alternating fashion across the sheet. This greatly increases the speed at which the lines 64 can be read, since the reader 14 does not have to be returned to the same side of the sheet 64 each time a line is read in order to read the next line 64. This also reduces the likelihood that a line 64 will be skipped during the reading process. As will be discussed in further detail later, the template 60 assists in this back and forth serpentine movement of the reader 14 by permitting accurate and rapid indexing from one line 64 to the next at the ends of each line.

5. Template 60 (FIGS. 6–10)

As shown in detail in FIGS. 6 through 9, the template 60 is in the form of a plate having a top surface 80, a generally flat bottom surface 82, an outer rim 84, a plurality of parallel slots 86, a plurality of guide ribs 88, and a pair of alignment reticules 90 and 92.

In use, the template 60 is placed over and aligned with the sheet 62 so that each slot 86 lies directly over one of the lines 64 of the bar code printed on the sheet 62. Proper registry of the template 60 with the sheet 62 is achieved by aligning the cross hairs of the reticules 90 and 92 with the alignment marks 66 and 68, respectively, on the sheet 62. In order to avoid accidental relative movement or slippage of the template 60 and the sheet 62 once alignment has been achieved, a mechanical restraint system is provided. In this particular embodiment, the mechanical restraint system is in the form of a pair of textured or roughened surface bands 94 and 96 adjacent the upper and lower edges (as viewed in FIG. 7) of the bottom surface 82 which engage the surface of the sheet 62 to prevent unwanted shifting.

Ribs 88 constitute guide tracks for the hand-held reader 14, so that the probe 50 will be aligned over and extend downwardly into one of the slots 88, and will move longitudinally within that slot 88 as the reader 14 is moved along a line of bar code recorded on the sheet 62. The bottom surface of the cover housings 46A and 46B of the reader 14 has a plurality of parallel grooves or notches 100A-100F (see FIGS. 3 and 10) which mate with the ribs 88 to guide the movement of the reader 14. As long as at least two of the grooves or notches 100A-100F remain in engagement with the ribs 88, the probe 50 remains in one of the slots 86.

Each of the ribs 88 has a central section 88A which has a first height, and left and right end sections 88B and 88C which are of a second or lower height. The central section 88A is preferably as long as or slightly longer than the various lines 64 of the bar code. The left and right end sections 88B and 88C are of reduced height to permit easy indexing of the reader 14 to the next line down when the reader 14 has reached the end of a line of bar code. The left and right sections 88B and 88C of the ribs 88 are still of sufficient height so that the user will have a positive indication that the reader 14 has been incrementally shifted on the template 60 by one line only rather than by two or three lines.

Having the length of the slots 86 greater than the length of the lines 64 of bar code has another advantage. It provides a distance at the beginning and end of each scanning movement of the reader 14 which enables the reader 14 to be accelerated before a reading period is initiated and to be decelerated after a reading period has been completed. As a result, the manual movement of the reader 14 along lines 64 of bar code (which occurs as the reader 14 moves over the central portions 88A) is more nearly uniform in velocity than is achieved with unguided movement and with movement that starts immediately at the beginning of the scanning of a line of bar code.

To achieve a more uniform reading speed, there are located at the left and right ends of each slot 86, as best viewed in FIG. 8, end ramps 102 and 104, respectively. The end ramps 102 and 104 lift the probe 50 out of the particular slot 86 in which it is then received when the reader 14 is moved beyond either end of the slot 86.

As shown in FIG. 6, the parallel ribs 88 form the slots 86, the ribs 88 being spaced sufficiently so that a slot 86 is provided between each pair. In addition, there is a lowermost rib 88' along the lower edge of the template 60, as viewed in FIG. 6, to aid in guiding the movement of the reader 14 when the lowermost line of bar code is being read. In that case, the groove 100A receives the rib 88 immediately above the lowermost slot 86, and the groove 100B receives rib 88'. It will be appreciated that the rib 88', while lowermost in FIG. 6, would appear at the right in FIG. 4 if the full template 60 were shown in this figure.

In the embodiment shown in FIG. 6, circles 106 and 108, containing indicia denoting the line numbers of specific lines 64 of the bar code, are provided along the rim 84 adjacent the corresponding slot 86. In this embodiment, odd numbered lines are designated by the circles 106 along the left hand portion of the rim 84, while even numbered lines are designated by the circles 108 along the right hand portion of the rim 84. The positioning of the circles 106 and 108 along the left and right hand portions of the rim 84, respectively, also serves as a reminder to the user of the direction of movement of the reader 14 along template 60. The odd numbered lines are to be scanned from left to right, while the even numbered lines are to be scanned from right to left.

The bar code scanner 10, when used in conjunction with the template 60, provides a simple yet accurate and rapid means for loading computer programs or data into a computer. When the user decides to load information printed in bar code form on a sheet into a computer, the bar code scanner 10 is connected via the input port to the computer. The template 60 is aligned over the sheet 62, the hand-held reader 14 is removed from cradle 34, and the lines 64 of bar code are read by moving the hand-held reader 14 back and forth in a serpentine fashion across the template 60, the reader 14 being constrained for rectilinear movement by the ribs 88 of the template 60. Of course, the probe 50, in this way, travels in the particular slot 86 that is in alignment with the data line 64 that is to be read at this time. With the present invention, a typical program for, say, a home computer can be scanned and transferred to the computer, error free, in less than five minutes.

6. The Optical Bar Code (FIG. 11)

FIG. 11 shows an optical bar code used in one practical embodiment of the present invention. This bar code has several important features. First, the greatly enlarged bar code of FIG. 11 uses a combination of seven cells to represent a hexadecimal character (which is the equivalent of four bits of data). In the prior art, on the other hand, bar codes typically include nine cells to represent four bits of data. In FIG. 11, individual codes are shown for each of the hexadecimal characters 0 through 9 and A through F.

Second, in the optical bar code of FIG. 11, the width of a double-cell bar (i.e. two consecutive "marks" or two consecutive "spaces") can be only twice the width of a single-cell bar or module. In the prior art, a physical width ratio of three-to-one between a double bar and a single bar has usually been required in order to ensure a reliable reading of the code.

Third, with the bar code shown in FIG. 11, no more than two "marks" or two "spaces" appear consecutively (with the exception of the end-of-line character described in the next paragraph); the first two cells of each character are always different; and the last two cells of each character are always different. As a result, no combination of consecutive characters will result in a bar or module which is larger than two cells.

Fourth, in addition to the hexadecimal characters, the bar code also includes an end-of-line character (designated "H") which has seven consecutive marks. This end-of-line character provides a clear visual indication to the user of which direction the line is to be scanned. It also provides an easily recognized indication to the scanner 10 that the line has ended.

In the bar code embodiment of FIG. 11, the width of a single cell can be on the order of five mils (0.005 inch), so that each hexadecimal character is then only thirty-five mils (0.035 inch) in total width. This dimension is considerably smaller than employed in conventional bar codes, which require more bars and wider bar thicknesses. Obviously, greater widths can be employed; it is just that there is a decided space advantage, as hereinbefore mentioned, in utilizing a high density bar code.

7. The Bar Code Page Format

In an illustrative example, each bar code line 64 on the sheet 62 includes a total of 96 hexadecimal characters or "nibbles" which can be identified as "Nibble Numbers 0-95" (see Table 1). Each line 64 would begin with the start of a line character (D=1010101), followed by a pair of characters defining the line number, a pair of characters defining a function code, and a pair of characters indicating the quantity of data bytes contained in that line. In this example, the next 86 characters would be available as data characters. At the end of the line, there would be two characters which represent a check sum, followed by the end-of-line character (H=1111111).

The checksum byte at the end of each line represents a byte of data which, when added to all of the other characters in that line, will result in a predetermined number, such as zero. This is a final check that all of the bytes of data in the line were properly read.

At the beginning of each program is a Control Array formed by one or more lines 64. The Control Array provides the control unit 12 with all of the information which will be necessary in order for the control unit 12 to emulate an input device to the particular type of computer for which the program or data has been written. Table 1 illustrates in general terms the content of the Control Array, and Tables 2 and 3 illustrate the content of the function code byte (Nibbles Numbers 3 and 4) and the machine type byte (Nibbles 7 and 8) of the control array.

TABLE 1

| NIBBLE NUMBER | FUNCTION |
|---|---|
| 0 | START OF LINE CHARACTER |
| 1 | LINE NUMBER LOW NIBBLE |
| 2 | LINE NUMBER HIGH NIBBLE |
| 3 | FUNCTION BYTE LSN(LSN = Low Significant Nibble) |
| 4 | FUNCTION BYTE MSN(MSN = High Significant Nibble) |
| 5 | LAST NIBBLE NUMBER (LSN) |
| 6 | LAST NIBBLE NUMBER (MSN) |
| 7 | MACHINE TYPE LSN |
| 8 | MACHINE TYPE MSN |
| 9 | TRANSMIT BLOCK LENGTH LSN |
| 10 | TRANSMIT BLOCK LENGTH MSN |
| 11 | NUMBER OF TIMES BLOCK XMITTED LSN |
| 12 | NUMBER OF TIMES BLOCK XMITTED MSN |
| 13 | NUMBER OF LINES IN THIS PROGRAM LSN |
| 14 | NUMBER OF LINES IN THIS PROGRAM MSN |
| 15 | NO. LINES LSN |
| 16 | NO. LINES MSN |
| 17 | LEADER LENGTH IN SECONDS LSN |
| 18 | LEADER LENGTH IN SECONDS MSN |
| 19 | INTER RECORD GAP LENGTH LSN |
| 20 | INTER RECORD GAP LENGTH MSN |
| 21 | GAP CONTENT (HI OR LO) |
| 22 | GAP CONTENT (HI OR LO) |
| 23 | START BIT TIME LSN |
| 24 | START BIT TIME MSN |
| 25-39 | START BITS 2-4 |
| 31 | MARK BIT 1 LSN |
| 32 | MARK BIT 1 MSN |
| 33-38 | MARK BITS 2-4 |
| 39 | SPACE BIT 1 LSN |
| 40 | SPACE BIT 1 MSN |
| 41-46 | SPACE BITS 2-4 |
| 47 | END BIT 1 LSN |
| 48 | END BIT 1 MSN |
| 49-54 | END BIT 2-4 |
| 55 | NUMBER OF MARK TIMES PER MARK (LSN) |
| 56 | NUMBER OF MARK TIMES PER MARK (MSN) |
| 57 | NUMBER OF SPACE TIMES PER SPACE (LSN) |
| 58 | NUMBER OF SPACE TIMES PER SPACE (MSN) |
| 59-60 | FLAG BYTE |
| BIT | USE |
| 7 | NO TOGGLE ON OUTPUT IF SET (DC) |
| 6 | NO END BIT/NO PARITY IF SET |
| 5 | NO END BIT IF SET |
| 4 | NO PARITY BIT IF SET |
| 3 | ROTATE LEFT IF SET |
| 2 | ODD PARITY IF SET |
| 1 | NO TIMEOUT IF SET |
| 0 | ⅛ DATA BITS (7 if set) |
| 61-62 | MARK MASK |
| 63-64 | SPACE MASK |
| 65-66 | INTER RECORD GAP MASK |
| 67-68 | NUMBER OF BLOCKS |
| 69-70 | START OF DATA IN LINE |
| 71-72 | NUMBER OF LINES THIS ARRAY |
| 73-74 | NOT USED |
| 75-76 | NOT USED |
| 77-78 | NOT USED |
| 79-82 | START LOCATION |
| 83-86 | END LOCATION |
| 87-88 | NUMBER OF NIBBLES PER LINE |
| 89-92 | NOT USED |
| 93 | CHECKSUM LSN |
| 94 | CHECKSUM MSN |
| 95 | END OF LINE |

TABLE 2

FUNCTION CODE BYTE - NIBBLES 3 AND 4

| Value | Use | Line No. Byte Use |
|---|---|---|
| 0 | GENERATE TONES<br>tone code bit<br>7<br>6<br>5<br>4<br>3<br>2<br>1<br>0 | TONE CODE<br>function<br>input complete tone<br>bad unit prompt<br>timeout warning<br>low battery<br>good line read<br>not used<br>not used<br>not used |
| 1 | CONTROL ARRAY | ALWAYS 0 |
| 2 | RAM FIRMWARE | LINE # |
| 3 | DATA LINE<br>sequential data<br>block format<br>not last line | LINE # |
| 4 | DATA LINE<br>non sequential<br>non block format | |
| 5 | DATA LINE<br>sequential<br>not block<br>last line | LINE # |
| 6 | non sequential<br>block format<br>last line | |
| 7 | DATA LINE<br>non sequential<br>block format<br>not last line | LINE # |
| 8 | THIS BIT USED TO INDICATE LAST LINE OF FIRMWARE PATCH | |

TABLE 3

MACHINE TYPE BYTE - NIBBLES 7 AND 8

| Contents | Definition |
|---|---|
| 1 | Atari 400/800/1200 |
| 2 | Commodore |
| 3 | Texas Instruments 99/4 |
| 4 | Timex 1000 |
| 5 | Timex 2000 |
| 6 | RADIO SHACK |
| 7 | RS-232 |
| 8 | Commodore no loader |
| 9 | Commodore no loader/no header |

The content of the Control Array varies, of course, depending upon the particular computer for which the information is written. For the purpose of illustration, Control Arrays for two computers (Computer A & B) will be described. It should be recognized, however, that the present invention is not limited to these two particular computers, and that the examples shown merely illustrate the ability of the scanner 10 to accommodate the unique requirements of different computers.

The Computer A has an input format which begins with a Leader Block, followed by a Header Block, a 0.5 second Inter-Record Gap, another Leader Block, a Data Block, and a Trailing Block. Both of the Leader Blocks contained in the input format consist of the hexadecimal number "55" repeated one hundred twenty-eight times. The Header Block contains bytes of data which are used to describe the Data Blocks which follow. The 0.5 second Inter-Record Gap is used to give the computer time to process the program title information contained in the Header Block. No transmission is needed during this time gap. The Data Block contains program data. The Trailing Block follows the last Data Block, and informs the computer that no data follows.

Table 4 illustrates the Control Array which is stored in bar code form upon the sheet 62 when the program is written for Computer A.

TABLE 4

COMPUTER A CONTROL ARRAY DEFINITION

| BYTE NO. | CONTENTS | DEFINITION |
|---|---|---|
| 0 | D | START OF LINE CHARACTER |
| 1 | 0 | LINE NUMBER |
| 2 | 0 | FUNCTION CODE |
| 3 | 95 | NUMBER OF NIBBLES THIS LINE |
| 4 | 6 | MACHINE TYPE |
| 5 | 215 | TRANSMIT BLOCK SIZE |
| 6 | 1 | NUMBER OF TIMES EACH BLOCK TRANSMITTED |
| 7 | 0 | NUMBER OF LINES IN THIS PROGRAM LSB |
| 8 | 0 | NUMBER OF LINES IN THIS PROGRAM MSB |
| 9 | 0 | LEADER LENGTH IN QUARTER SECONDS |
| 10 | 0 | INTER RECORD GAP TIME IN QUARTER SECONDS |
| 11 | 0 | GAP CONTENT MASK |
| 12 | 0 | START BIT WAVEFORM TIME |
| 13 | 0 | START BIT WAVEFORM TIME |
| 14 | 0 | START BIT WAVEFORM TIME |
| 15 | 0 | START BIT WAVEFORM TIME |
| 16 | 0 | MARK BIT WAVEFORM TIME |
| 17 | 0 | MARK BIT WAVEFORM TIME |
| 18 | 22 | MARK BIT WAVEFORM TIME |
| 19 | 22 | MARK BIT WAVEFORM TIME |
| 20 | 0 | SPACE BIT WAVEFORM TIME |
| 21 | 0 | SPACE BIT WAVEFORM TIME |
| 22 | 67 | SPACE BIT WAVEFORM TIME |
| 23 | 67 | SPACE BIT WAVEFORM TIME |
| 24 | 0 | END BIT WAVEFORM TIME |
| 25 | 0 | END BIT WAVEFORM TIME |
| 26 | 0 | END BIT WAVEFORM TIME |
| 27 | 0 | END BIT WAVEFORM TIME |
| 28 | 1 | NUMBER OF MARK TIMES PER MARK |
| 29 | 1 | NUMBER OF SPACE TIMES PER SPACE |
| 30 | 64 | FLAG BYTE |
| 31 | 96 | MARK MASK |
| 32 | 159 | SPACE MASK |
| 33 | 64 | INTER RECORD GAP MASK |
| 34 | 0 | NUMBER OF BLOCKS THIS PROGRAM |
| 35 | 7 | START OF DATA IN THE LINE |
| 36 | 1 | NUMBER OF LINES IN THIS ARRAY |
| 37 | 0 | NOT USED |
| 38 | 0 | NOT USED |
| 39 | 0 | NOT USED |
| * 40 | 0 | START LOCATION LSB |
| * 41 | 0 | START LOCATION MSB |
| * 42 | 0 | END LOCATION LSB |
| * 43 | 0 | END LOCATION MSB |
| 44 | 95 | END OF DATA LOCATION |
| 45 | 0 | NOT USED |

* Not used by Computer A.

The Computer B has an input format as follows: a 12 second Inter-Record Gap, a Header Block for loader, a second Header Block, a twelve-second Inter-Record Gap, a Bootstrap Loader, a twelve-second Inter-Record Gap, a Header Block for program, a twelve-second Inter-Record Gap, a Data Block, and an Error Block.

The Header Block for the Bootstrap Loader contains information describing the contents of the data to follow. The Bootstrap Loader Program Blocks are similar to the Header Blocks except that they are memory image blocks and therefore are as long as necessary. In addition, the Bootstrap Loader contains a block type byte, but the start and end address bytes are not contained in the Bootstrap Loader Program Block.

The Header Block for the program is the same as the Bootstrap Loader except that the load and end addresses and the exclusive OR check byte are different. The start and end bytes are contained in the Control Array and are determined by the program to be loaded.

The Data Block contains the actual program data to be transmitted. The Error Block represents error bytes which force the loader software in the Computer B to exit.

Table 5 describes the format of the Control Array for a Computer B.

TABLE 5

COMPUTER B CONTROL ARRAY DEFINITION

| BYTE NO. | CONTENTS | DEFINITION |
|---|---|---|
| 0 | D | START OF LINE CHARACTER |
| 1 | 0 | LINE NUMBER |
| 2 | 0 | FUNCTION CODE |
| 3 | 95 | NUMBER OF NIBBLES THIS LINE |
| 4 | 2 | MACHINE TYPE |
| 5 | 202 | TRANSMIT BLOCK SIZE |
| 6 | 2 | NUMBER OF TIMES EACH BLOCK TRANSMITTED |
| 7 | 0 | NUMBER OF LINES IN THIS PROGRAM LSB |
| 8 | 0 | NUMBER OF LINES IN THIS PROGRAM MSB |
| 9 | 48 | LEADER LENGTH IN QUARTER SECONDS |
| 10 | 48 | INTER RECORD GAP TIME IN QUARTER SECONDS |
| 11 | 0 | GAP CONTENT MASK |
| 12 | 55 | START BIT WAVEFORM TIME |
| 13 | 59 | START BIT WAVEFORM TIME |
| 14 | 41 | START BIT WAVEFORM TIME |
| 15 | 32 | START BIT WAVEFORM TIME |
| 16 | 41 | MARK BIT WAVEFORM TIME |
| 17 | 41 | MARK BIT WAVEFORM TIME |
| 18 | 25 | MARK BIT WAVEFORM TIME |
| 19 | 14 | MARK BIT WAVEFORM TIME |
| 20 | 25 | SPACE BIT WAVEFORM TIME |
| 21 | 25 | SPACE BIT WAVEFORM TIME |
| 22 | 41 | SPACE BIT WAVEFORM TIME |
| 23 | 32 | SPACE BIT WAVEFORM TIME |
| 24 | 0 | END BIT WAVEFORM TIME |
| 25 | 0 | END BIT WAVEFORM TIME |
| 26 | 0 | END BIT WAVEFORM TIME |
| 27 | 0 | END BIT WAVEFORM TIME |
| 28 | 1 | NUMBER OF MARK TIMES PER MARK |
| 29 | 1 | NUMBER OF SPACE TIMES PER SPACE |
| 30 | 64 | FLAG BYTE |
| 31 | 96 | MARK MASK |
| 32 | 0 | SPACE MASK |
| 33 | 96 | IRG MASK |
| 34 | 0 | NUMBER OF BLOCKS THIS PRO- |
| 35 | 9 | START OF DATA IN THE LINE |
| 36 | 1 | NUMBER OF LINES IN THIS ARRAY |
| 37 | 0 | NOT USED |
| 38 | 0 | NOT USED |
| 39 | 0 | NOT USED |
| 40 | 0 | START LOCATION LSB |
| 41 | 0 | START LOCATION MSB |
| 42 | 0 | END LOCATION LSB |
| 43 | 0 | END LOCATION MSB |
| 44 | 95 | END OF DATA LOCATION |

8. Reader 14 Circuitry (FIG. 12)

Figure 12:
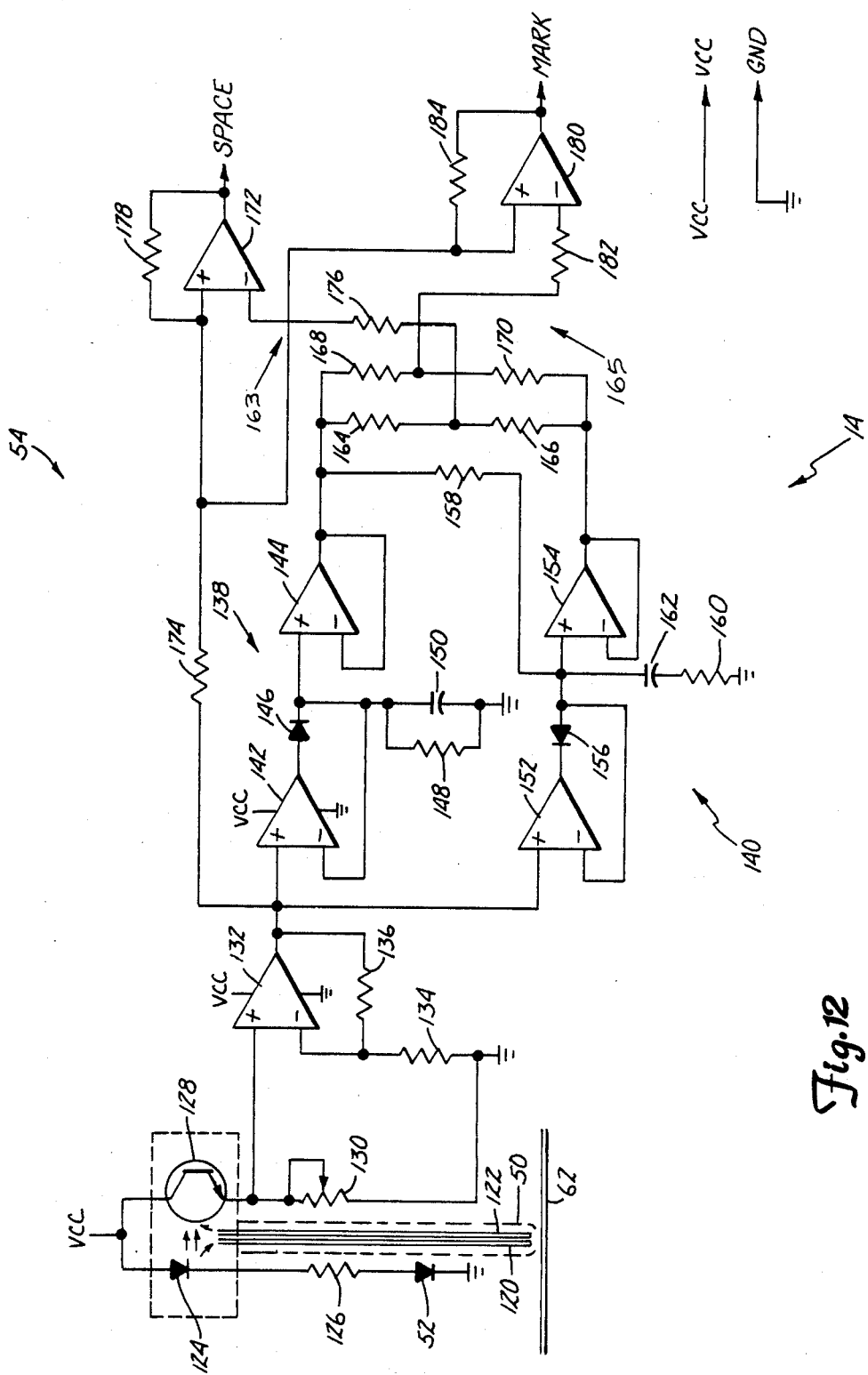
FIG. 12 is an electrical schematic diagram of the circuitry contained in the reader system exemplifying the present invention, and FIGS. 13A–13C collectively constitute an electrical schematic diagram of the circuitry contained in the control unit of the reader system of the present invention.

FIG. 12 is an electrical schematic diagram showing the probe 50, the POWER ON indicator light 52, and the analog circuitry 54 of the reader 14. The analog circuitry 54 converts the bar code being scanned by the reader 14 into an output in the form of a pair of logic level pulses (designated "SPACE" and "MARK") which are supplied to the control unit 12.

The probe 50 of the reader 14, as can be discerned from FIG. 12, consists of a pair of fiber optic light guides 120 and 122. The light guide 120 receives light from a light emitting diode (LED) 124 and conducts that light downward to the lower end of the probe 50, where the light is directed onto the surface of the sheet 62. The LED 124, a resistor 126, and the POWER ON indicator light 52 (which is also a light-emitting diode) are connected in series between supply voltage VCC and ground.

The fiber optic light guide 122 receives light reflected from the sheet 62 and directs that light upward to a phototransistor 128. The collector-emitter current path of the phototransistor 128 is connected in series with a potentiometer 130, a circuit in this way being established between VCC and ground. The potentiometer 130 provides a factory adjustment for any change in gain due to variations in light leakage in probe 50.

The signal from the phototransistor 128 is amplified by a first stage amplifier circuit which includes an operational amplifier (op amp) 132 and resistors 134 and 136. In the depicted embodiment of the present invention, the first stage of amplification is very large with a gain on the order of about 400. This stage converts the relatively small (microampere) changes in current through the transistor 128 into relatively large (on the order of $\frac{1}{2}$ volt) changes in voltage at the output of the op amp 132.

The output of the op amp 132 is forwarded to a maximum detection circuit 138 and to a minimum detection circuit 140. The maximum detection circuit 138 includes op amps 142 and 144, a diode 146, a resistor 148, and a capacitor 150. The minimum detection circuit 140 includes op amps 152 and 154, a diode 156, resistors 158 and 160, and a capacitor 162.

In the maximum detection circuit 138, the diode 146 permits only positive going signals from the op amp 142 to charge the capacitor 150, so that the voltage on this capacitor 150, which is applied to the noninverting (+) input of the op amp 144, represents the maximum voltage. When the waveform produced by the op amp 132 (which is generally sinusoidal) is going through a negative half-cycle, the capacitor 150 is permitted to discharge slightly through the resistor 148 to ground. The time constant of the resistor 148 and capacitor 150 is selected so that the capacitor 150 discharges slowly enough that only legitimate peak voltages will be sensed, and yet fast enough that slight variations in peak voltages will be accommodated.

In the minimum detection circuit 140, the diode 156 permits only negative going signals to pass from the output of amplifier 152. The capacitor 162 is discharged through the diode 156 to the minimum voltage which appears at the output of the op amp 132. During each positive going portion of the cycle, the capacitor 162 is charged toward the maximum value which appears at the output of the op amp 144.

The sinusoidal output waveform from the op amp 132 is compared to first and second reference voltages by first and second comparator circuits 163 and 164 to produce the SPACE and MARK signals. The first comparator circuit 163 includes a first voltage divider (formed by resistors 164 and 166), an op amp 172 and resistors 174, 176 and 178. The second comparator circuit 165 includes a second voltage divider formed by resistors 168 and 170), an op amp 180, and resistors 182 and 184.

The first comparator circuit 163 compares the output of the op amp 132 with the first reference voltage derived by the first voltage divider 164, 166 (which is connected between the outputs of the maximum and minimum detection circuits 138 and 140). When the signal from the op amp 132 exceeds the first reference voltage, the "SPACE" output of the op amp 172 is high. This indicates the presence of a space under the tip of the probe 50.

The second comparator circuit 165 compares the signal from the op amp 132 with the second reference voltage derived by the second voltage divider 168, 170 from the outputs of the maximum and minimum detection circuits 138 and 140. The second reference voltage is lower than the first reference voltage. When the signal exceeds the second reference voltage, the MARK output of the op amp 180 is high, and when the signal is less than the second reference voltage, the MARK output of the op amp is low. A low MARK output from the op amp 180 represents the presence of a "mark" under the probe 50.

The use of two voltage dividers to provide two reference voltages achieves an effective dead band in the detection of spaces and marks. The resistance of the resistor 164 is less than that of the resistor 166, so that the first reference voltage has a value greater than the mean of the maximum and minimum values for the maximum and minimum detectors 138 and 140. The resistance of the resistor 168 is greater than the resistance of the resistor 170, so that the second reference voltage has a value which is less than the mean of the maximum and minimum values. Resistors 178 and 184 provide hysteresis for the comparators 172 and 180 to help reject false signals generated by paper/ink variations.

9. The Control Unit Circuitry (FIGS. 13A–13C)

Figure 13A:
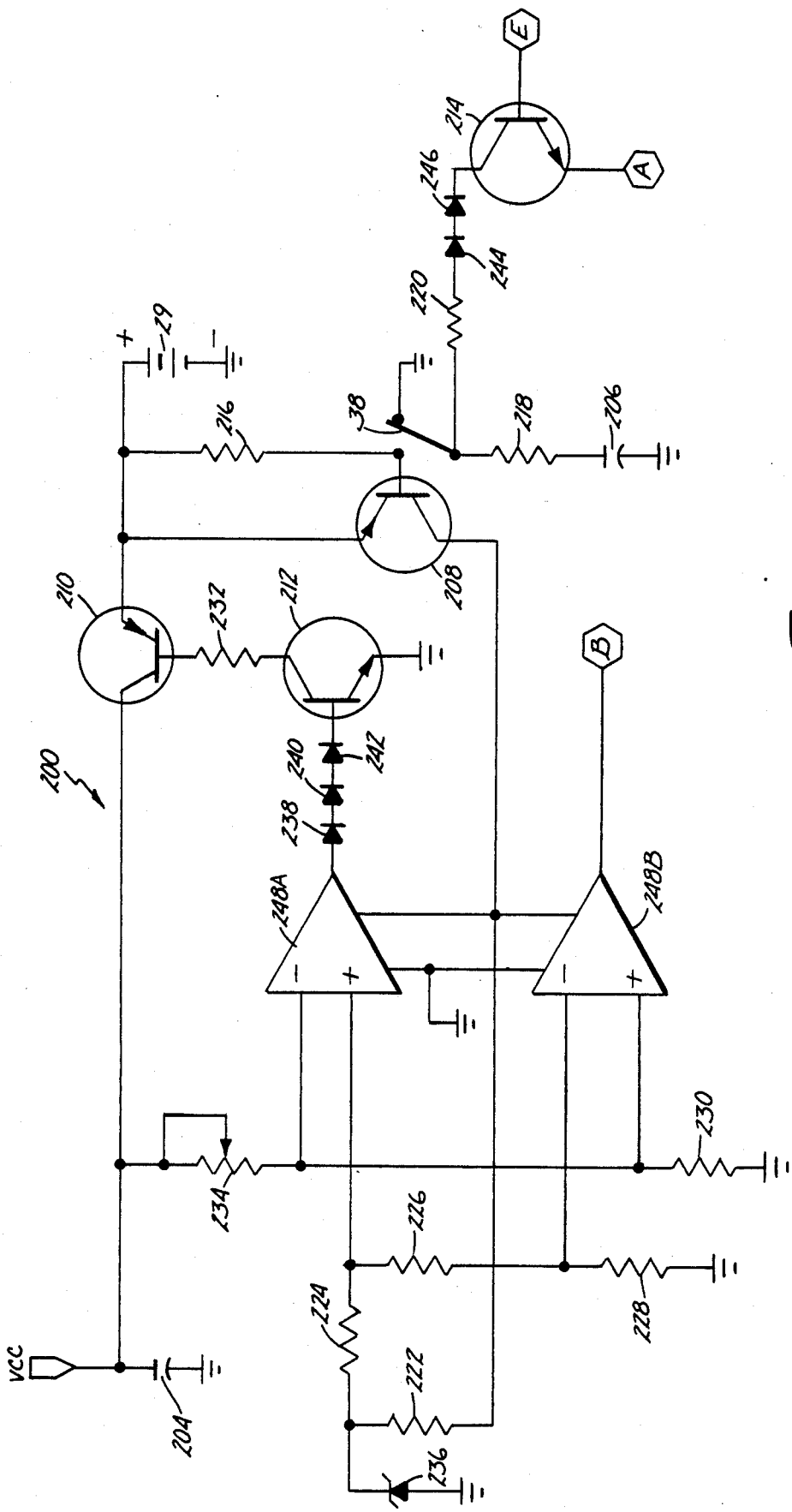
Figure 13C:
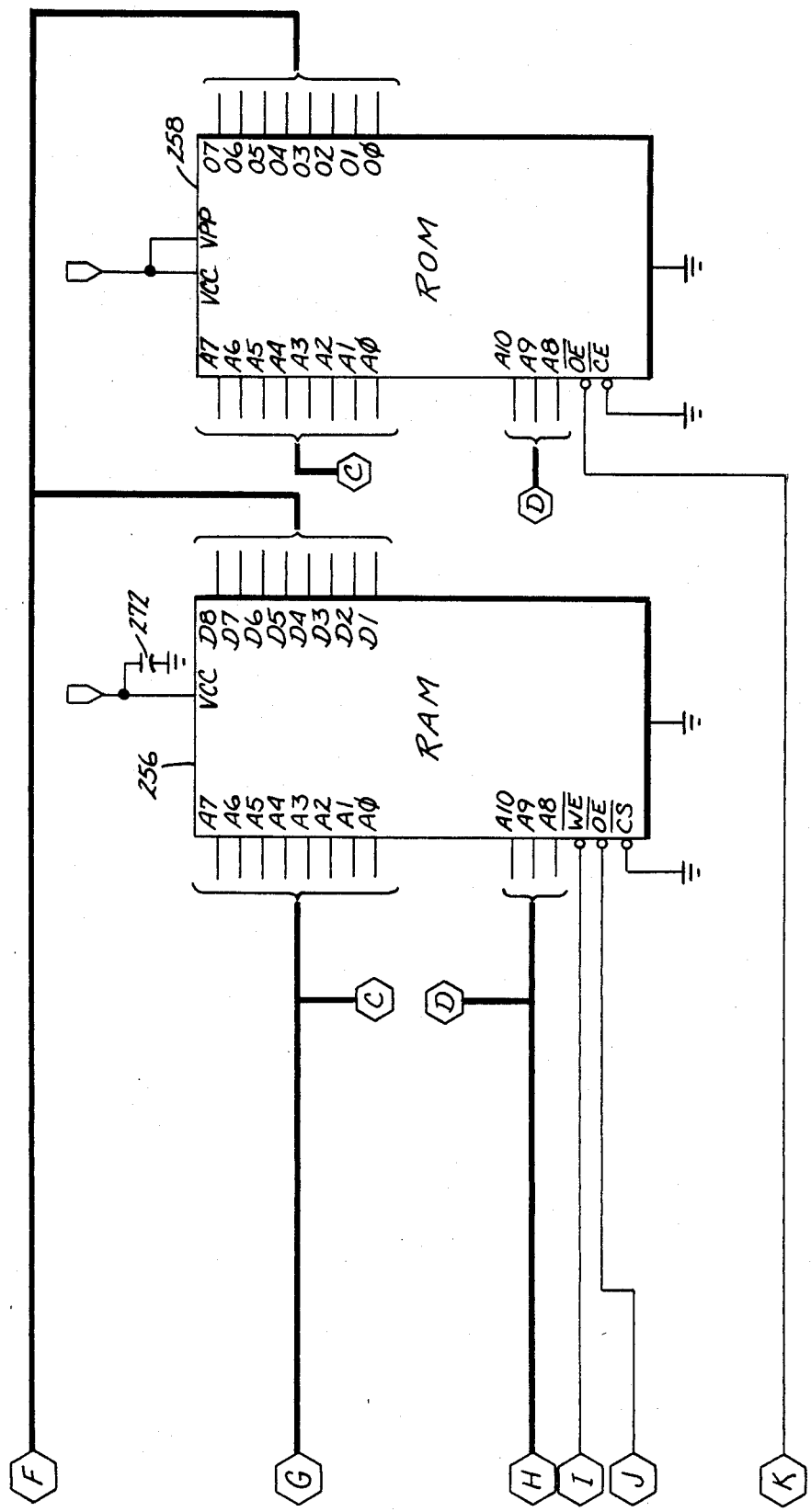

FIGS. 13A-13C show the circuitry of the control unit 12. FIG. 13A shows power supply circuitry 200, which provides the power for both the control unit 12 and the reader 14.

Voltage regulator circuit 200 is powered by the battery 29 (the four cells of which would be located in the battery compartments 30 and 32 of the control unit 12). In the embodiment shown in 13A, the battery 29 includes four D cells connected in series to provide a combined voltage which is nominally six volts. Because the voltage supplied by the battery 29 can vary considerably, while the logic circuitry of the control unit 12 requires a supply voltage VCC which is within a very narrow range of +5 volts, the voltage regulator 200 converts the battery voltage to the regulated voltage VCC.

In the embodiment shown in FIG. 13A, the voltage regulator circuit 200 includes the battery 29, the power switch 38, capacitors 204 and 206, transistors 208, 210, 212 and 214, resistors 216, 218, 220, 222, 224, 226, 228, 230 and 232, a potentiometer 234, a zener diode 236, and diodes 238, 240, 242, 244 and 246.

Regulated voltage, VCC, is derived from the positive terminal of the capacitor 204. Charging of the capacitor 204 is controlled through the transistor 210, and the capacitor 204 is discharged through a voltage divider comprised of the potentiometer 34 and the resistor 230.

Operation of the voltage regulator circuit 200 is controlled by a power latch-on circuit formed by the power switch 38, the transistors 208 and 214, the capacitor 206, the resistors 244, 246 and a microcomputer 250 (FIG. 13B). As shown in FIG. 13A, the power switch 38 is in its normally open position, a condition in which it remains as long as the reader 14 is in the cradle 34 of the control unit 12. When the reader 14 is removed from the cradle 34, the plunger 28 is permitted to move upwardly, and the switch 38 is allowed to close.

As long as the power switch 38 is open, the transistor 208 is turned off (due to the reverse bias via the resistor 216). This deprives a pair of op amps 248A and 248B of power and, as a result, the transistors 210, and 212 remain turned off.

If the user has installed four cells comprising the battery 29 incorrectly, so that the polarity of the voltage is reversed, the regulator circuit 200, under these circumstances, protects the remaining circuitry of the scanner 10 from the reverse polarity because under those conditions neither transistor 208 nor transistor 210 will turn on even when the switch 38 closes.

When the power switch 38 closes (and the cells of the battery 29 are connected in the proper polarity relationship), current begins to flow from the battery 29 through the resistors 216 and 218 to charge the capacitor 206. As long as current continues to flow, the transistor 208 is turned on, which supplies power to the op amps 248A and 248B, and supplies current through resistor 222 to the zener diode 236. A regulator reference voltage is thereby established at the cathode of the zener diode 236. The reference voltage is reduced by a voltage divider formed by resistors 224, 226, and 228 to provide a first regulator reference voltage to the noninverting (+) input of the op amp 248A, and a second lower regulator reference voltage to the inverting (−) input of the op amp 248B.

The op amp 248A compares the first regulator reference voltage at its noninverting (+) input with the voltage at its inverting (−) input, which is derived from the voltage divider formed by the potentiometer 234 and resistor 230, and thus represents the supply voltage, VCC, across the capacitor 204. If the first regulator reference voltage exceeds the voltage derived from the capacitor 204, the output of the op amp 248A goes high, which supplies biasing current through the diodes 238, 240 and 242 to the base of the transistor 212. This causes the transistor 212 to turn on, which turns on the transistor 210. Once the transistor 210 is turned on, current is permitted to flow from the battery 29 to the capacitor 204, which causes voltage, VCC, to rise. When the voltage at the inverting (−) input of the op amp 148A equals the first regulator reference voltage at the noninverting input of the op amp 248A, the output of the op amp 248A goes low and the transistors 212 and 210 are turned off.

When the power switch 38 initially closes, current will continue to flow through the resistors 216 and 218 until capacitor 206 is charged to a level at which transistor 208 turns off, and at that point the remaining transistors 210 and 212 will turn off. The time constant for the charging of the capacitor 206 is selected, in one example, so that the time between switch 38 closing and turn off of the transistor 208 is such that within that time period the microcomputer 250 can perform initial reset and diagnostic routines to ensure that the scanner 10 is ready for operation. If the microcomputer 250 successfully completes the reset and diagnostic routines before the time period in which the charging of the capacitor 206 takes place, it will turn on the transistor 214, which shunts capacitor 206 and permits transistor 208 to remain on. If the microcomputer 250 fails to be reset or to complete its diagnostic procedures properly, the transistor 214 is not turned on, and the transistor 208 turns off, thereby removing power from the remaining circuitry of the voltage regulator 200. Table 6 lists the reset and diagnostic functions performed by the microcomputer 250 on power up.

TABLE 6
RESET AND DIAGNOSTIC FUNCTIONS

I. MICROPROCESSOR HARDWARE RESET
  A. Initialize Internal CPU Registers.
  B. Initialize Output Ports to known states.
  C. Start CPU execution at Power Up Address.
II. POWER ON LATCH
  A. Set Output Port bits that enable transistor 217 in FIG. 13A (Voltage Regulator) to latch VCC Power on.
III. RAM ADDRESS TEST
  A. Check that correct addressing of RAM is possible.-
    1. If Pass, go to Step IV.
    2. If Fail, issue Bad Unit Prompt and shut off the unit after a time delay
IV. RAM DATA TEST
  A. Check ability of RAM to correctly store data.-
    1. If Pass, go to Step V.
    2. If Fail, issue Bad Unit Prompt and shut off the unit after a time delay.
V. OUTPUT SIGNAL LINE TEST
  A. Verify that the Output Lines can be controlled.-
    1. If Pass, go to Step VI.
    2. If Fail, issue Bad Unit Prompt and shut off the unit after a time delay.
VI. TIMER TEST
  A. Verify that the Microprocessor Timer functions and has the required accuracy. -
    1. If Pass, go to Step VII.
    2. If Fail, issue Bad Unit Prompt and shut off the unit after a time delay.
VII. WAIT FOR BAR CODE INPUT The voltage regulator 200 also provides, through the output of the op amp 248B, a signal to the microcomputer 250 when a low voltage condition exists. As long as the voltage derived from capacitor 204 through the voltage divider comprised of the potentiometer 234 and resistor 230 exceeds the second regulator reference voltage, the output of the op amp 248B remains high. When the output goes low because the voltage at the noninverting (+) input of the op amp 248B drops below the second regulator reference voltage, the output of the op amp 248B goes low. This indicates to the microcomputer 250 that it should actuate an annunciator in the form of a buzzer 252 (FIG. 13B) to indicate a low voltage condition.

The digital logic and related circuitry of the control unit 12 is shown in FIGS. 13B and 13C. This circuitry includes the microcomputer 250, the buzzer 252, the audio jack 40, an address latch 254, RAM 256, ROM 258, capacitors 260, 262, 264, 266, 268, 270 and 272, a crystal oscillator 274, resistors 276, 278, 280 and 282, internal PROM jumper 284, EPROM available jumper 286, transistor 288, NAND gates 290, 292 and 294, and NOR gates 296 and 298.

As described previously, the microcomputer 250 performs reset and diagnostic functions upon power switch 38 being actuated by the removal of the reader 14 from its cradle 34. The reset circuit formed by the capacitor 266 and resistor 276 has a time constant which is sufficiently short so that the reset diagnostic functions can be performed in time for the microcomputer 250 to latch the voltage regulator 208 on within the period required to charge the capacitor 206.

The microcomputer 250 has onboard ROM and RAM storage. With the circuit shown in FIGS. 13B and 13C, the microcomputer 250 has the capability of being able to run on the basis of a program stored in the internal RAM or ROM or from external RAM 256 and or ROM 258. NAND gates 290, 292 and 294 and NOR gates 296 and 298 are used as control gates for controlling the selection of internal or external memory storage for storing various segments of a program.

The MARK and SPACE signals from the reader 14 are supplied to the T1 and T0 inputs, respectively, of the microcomputer 250. Based upon these inputs, the microcomputer 250 measures the bar scan time for each mark and space bar, determines whether the bar is a single or double bar, and stores the single or double bit in memory.

The operation of the microcomputer 250 in converting the MARK and SPACE signals from the reader 14 into digital data is described in detail in Table 9. In general, the microcomputer 250 measures the bar scan time of each mark bar by measuring the time period from the moment the MARK signal at T1 goes low until it goes high. The microcomputer 250 measures the bar scan time of a space bar by measuring the time period from when the SPACE signal at T0 goes high until it goes low.

Once the bar scan time has been measured, the microcomputer 250 determines whether the bar is a single or double-cell bar by comparing the measured bar scan time with a reference time value which is 1.5 times the single-cell bar scan time for one or more preceding bars of the same type. If a mark bar scan time has been measured, it is compared to the "low level synch time" value which is 1.5 times the single-cell bar scan time value of one or more preceding mark bars. Similarly, if the bar is a space, it is compared to the "high level synch time" value which is 1.5 times the single-cell bar scan time of one or more preceding spaces.

If the measured mark bar scan time is less than the low level synch time value, the microcomputer 250 determines that the mark bar was a single-cell bar and stores a single "1" in its bit accumulator. The microcomputer 250 then computes a new low level synch value based upon a measured mark bar scan time and stores that new reference time value for use when the next mark bar scan time is measured.

If the measured mark bar scan time is greater than the low level synch time value, the microcomputer 250 determines that the mark bar is a double-cell bar and stores two "1's" in the bit accumulator. The microcomputer 250 also divides the measured bar scan time in half to produce an equivalent single cell value, and then multiplies that value by 1.5 to generate a new low level synch time value representing the last mark bar. One or more synch time values for preceding mark bars may be used to derive the reference valve to be used when the next mark bar scan time is measured.

The operation of the microcomputer 250 with respect to space bars is similar. If the measured space bar scan time is less than the high level synch time value, the bar is a single-cell bar and the microcomputer 250 stores a single "0" in the bit accumulator. If, on the other hand, the measured space bar scan time is greater than the high level synch time value, the space bar is a double-cell bar, and the microcomputer 250 stores two "0's" in the bit accumulator. In the case of a single-cell space bar, the microcomputer 250 multiplies the measured bar scan time value by 1.5 to produce a new high level synch time value. In the case of a double-cell space bar, the measured space bar scan time is divided by 2 and then multiplied by 1.5 to produce the new high level synch time value. One or more high level synch values are used to derive the reference value to be used when the next space bar scan time is measured.

At the beginning of each line, the microcomputer 250 is waiting for the start of line hexadecimal character D. This portion of the operation of the microcomputer 250 is shown in Table 7, Section II, "Wait for 'D' Character". As the reader 14 reaches the final cells of the start of line character, the initial high level and low level synch time values are derived for use in measuring bar scan times of subsequent marks and spaces along the line. The measurement of bar scan times and the conversion of those bar scan times into stored bits in the bit accumulator and high level and low level synch values are described in Sections III and IV of Table 7. Sections V and VI describe the steps performed by the microcomputer 250 in combining the bits stored in the bit accumulator to form bytes of data.

As each byte is received and stored, the microcomputer 250 sums the values of that byte with previous bytes. At the end of each line 64, a checksum byte is provided which, when added to all of the previous values in the line, will result in a checksum which equals "0". These steps are described in Sections V and VI of Table 7.

TABLE 9
BAR CODE INPUT AND TRANSLATION

I. "STAND-BY FOR BAR CODE INPUT"
The accumulated checksum, bit accumulator, hexadecimal character bit counter, and line byte counter are set to zero. A flag is set to indicate that the first hexadecimal character (4 bits) encountered is the high nibble of a byte.

II. "WAIT FOR 'D' CHARACTER"
The input from the optical wand is checked for valid bar scan times on the first character of the line of bar code. The first character is always on a "D" hexadecimal character, which consists of only single-cell bars of alternating marks and spaces. If the measured mark or space bar scan times for this first character are too short or too long, then the optical wand is not yet scanning the actual "D" character and receiving spurious inputs. The last two cells of the "D" character are a single-cell space bar and a single-cell mark bar. These bars are used to calculate the initial reference bar scan times (high and low level synch) for future determination of single or double bars.

If no bar is detected, two other checks are performed. First, the battery is tested for low voltage. If the voltage is too low, an audible signal is generated, and the power is shut off. If the battery voltage is high enough, and if no bar has been detected for 30 seconds, an audible warning is TABLE 9-continued
BAR CODE INPUT AND TRANSLATION generated. This warning informs the operator that the unit will shut itself off in approximately 30 more seconds if no bar code is scanned.

III. "COMPUTE BAR SCAN TIME"
Once the "D" character has been sensed, the wand input lines are checked for state transitions. An input level check is used to detect an input change of state. Upon occurrence of the first input state change, a timer is started. The next state change stops the timer. This timer value then becomes the bar scan time for the last bar. The level detention also determines whether the bar scan time is for a mark or space bar, depending upon which input line was being sensed. If this bar scan time is out-of-range, an error has occurred. In this case, an audible error tone is generated and the rest of the bar code line is ignored.

IV. "STORE BAR AS BITS"
The bar scan time is compared to the reference high (space) or low (mark) synch time to determine whether the bar is a single-cell or a double-cell bar. These reference synch times are derived from one or more bar scan times of preceding bars of the same type. If the bar is a single-cell bar, a single "1" or a "0" bit is stored in the bit accumulator to represent the mark bar or space bar, respectively. the bit counter is incremented by one for a single-cell bar. If the bar is a double-cell bar, two "1" or "0" bits are stored in the bit accumulator and the bit counter is incremented twice (add 2). After the bits are stored, the new reference synch time is computed. If the bar is a single-cell bar, the bar scan time is multiplied by 1.5 and the result is used to derive the reference value for the next occurrence of this bar type (mark or space). If the bar is a double-cell bar, the bar scan time is divided by 2, multiplied by 1.5, and then used to derive the reference time for the next bar of this type. If the bit counter is less than 8, there are more cells to scan in the character. In this case, control transfers to Section III until a complete character is scanned.

V. "FIND HEX NIBBLE - STORE IN BYTE"
The bit accumulator is used in conjunction with a lookup table to find the 4-bit nibble represented by the bar code character. If no legal nibble is found, an audible error is generated, and the rest of the bar code line currently being scanned is ignored. If a legal value is found, the nibble is stored in a byte. If only the first of two nibbles required to fill a byte has been found, control returns to Section III to get the second nibble.
Once both nibbles for a byte have been found, the line byte counter is incremented. Using this counter value, the byte is checked for the following special cases:
  A. Line Number
    Every line of bar code contains a line number that is used to prevent lines from being scanned out of sequence. If the byte is a line number, it is checked for sequence. If the line number is legal, control is transferred to Section III to get the next character. If the line number is bad, this error is treated the same as a bad character read.
  B. Function Code
    Every line of bar code contains a function code that designates what should be done with the information on this line. For example, typical functions could be:
      1. Send this line data to the host computer
      2. Set-up host communications protocol
      3. Add a new function to unit's operation
      4. Initiate a self-diagnostic
  C. Nibble Count
    The number of characters on a line is included on every line of bar code to aid in bad read error detection. This value is

TABLE 9-continued
BAR CODE INPUT AND TRANSLATION checked for every character received to
determine if the unit has somehow detected
too many bar code characters.
D. Checksum
  If the current byte is the line checksum, it
  is compared to the accumulated checksum. If
  this check is not valid, a bad read error
  has occurred.
VI. "STORE BYTE IN OUTPUT BUFFER"
  If the byte is not one of the special cases, it
  is added to the accumulated checksum and transferred
  to a storage memory until the line read is complete.
  Once the end of a bar code line has been scanned, the
  function code is used to determine what to do with the
  data. After the function operation is completed,
  control is transferred to Section I to read the next
  line of bar code.

The microcomputer 250 provides an output to the computer through the audio jack 40. Ports P1.5 and P2.5 of the microcomputer 250 are connected through a resistor 279 to the base of the previously mentioned transistor 288, this transistor being an NPN type. By turning the transistor 288 on and off, the microcomputer 250 generates the data stream through audio jack 40 and a cable (not shown) which is connected to the computer (also not shown).

The microcomputer 250 drives the buzzer 252 through ports P1.7 and P2.7. By providing pulse trains of different frequency to the buzzer 252, the microcomputer 250 causes tones of different frequencies to be generated.

A Transmission Complete tone is generated when the control unit 12 has completed transmission to the computer. This tone can be a 2 KHz tone which lasts 0.5 second.

A Bad Unit tone is generated if the microcomputer 250 determines that the control unit 12 is not functioning properly during its initial power up diagnostic test. The Bad Unit tone is a "buzz" (low frequency) followed by a "beep" (high frequency).

A Timeout warning tone is generated if the reader 14 has been removed from the cradle 34, but no bar code has been read for a thirty second time period. The Timeout warning tone indicates to the user that the microcomputer 250 will turn off control unit 12 in, say, approximately thirty more seconds if the reader 14 does not begin to produce mark and space input signals. The Timeout warning signal, therefore, avoids excessive drain of the battery 26 if the reader 14 is removed from its cradle 34 but not used. The Timeout tone may consist of two successive tones: a 400 Hz tone of 0.5 second duration followed by a 1.3 KHz tone of 1.0 second duration.

A Low Battery tone is produced by the microcomputer 250 if the signal at its port P1.1 indicates a low battery voltage condition. This tone warns the user that the battery should be replaced. The Low Battery Tone may consist of a 400 Hz tone of 0.5 second duration followed by a 2.7 KHz tone of 0.5 second duration, after which the microcomputer 250 turns on the scanner 10 by turning off transistor 214.

A Good Line Read tone is generated each time the reader 14 has completed a successful scan of one of the lines 64 of bar code. The determination of whether a correct scan has occurred is made by the microcomputer 250 based upon the line having the correct line number and the check sum equalling zero. The Good Line Read tone is illustratively 2.7 KHz for 0.5 second.

The operation of the microcomputer 250 in providing the outputs of the scanner 10 is described in further detail in Table 8.

TABLE 8
DATA OUTPUT TO HOST COMPUTER

I. "SET-UP COMMUNICATIONS PROTOCOL"
  In a data transmission session, the first line of
  bar code to be read is the Control Array. The data in
  the Control Array is the information necessary to
  identify the type of host computer and its associated
  protocol. As a minimum, the protocol consists of
  timing information needed by the Waveform Generator.
  Because the output to the host computer is a single
  data line, the output is formatted into pulses of
  different duration. Typically, several pulse times
  are required to represent the data Binary Ones and
  Zeroes, Block Leaders, Block Trailers, and
  Inter-Record Gaps.
  In preparation for transmission, the Control
  Array data is loaded and protocol timers are started
  to ensure proper transmission waveform timing.
II. "HOST COMPUTER HEADER BLOCK
  TRANSMISSION"
  Each host computer usually requires that a block
  of information be transmitted prior to sending any
  data. This extra information can represent the type
  of data to be sent, and the number of bytes to be
  transmitted. A Header Block table is selected for the
  type of host computer, and loaded with the current
  parameters contained in the Control Array. This
  special block is then transmitted to the host computer
  by the Waveform Generator. The actual transmission of
  Header, Data, or Trailing Blocks to the host computer
  is accomplished by the output of a pulse waveform that
  matches the format requirements of the host computer.
  One general Waveform Generator is implemented to
  accept "configuration parameters" from the Control
  Array in order to customize the output pulse waveform
  to match the format of a particular host computer.
  In use, the Waveform Generator outputs levels
  which have time periods determined by groups of time
  slots, which are defined in the Control Array. Each
  group of time slots can be repeated,thus allowing
  transmission of a large variety of waveforms.
III. "DATA BLOCK TRANSMISSION"
  As each Data Block is transmitted to the host
  computer, any extra bytes required by the host
  computer protocol are added. The Data Blocks are
  transmitted by the Waveform Generator in a similar
  manner as described for the Header Block.
IV. "HOST COMPUTER POST BLOCK TRANSMISSION"
  For host computers requiring "Trailing Overhead"
  Blocks, that information is transmitted after the rest
  of the data has been sent. Another special block
  table is selected, loaded with information from the
  Control Array (if required), and transmitted to the
  host computer.

Conclusion

The system of the present invention provides simple and reliable loading of prerecorded data, such as a computer program, into a digital computer. By additionally including a Control Array line whibh defines the format for the actual data to be transmitted to the digital computer, the present invention permits the same scanner to be used with a wide variety of different programs and other data, as well as with various digital computers. The data contained in the Control Array line, which is received and stored by the scanner as part of the overall bar code recorded program or other informational data, is initially read. This permits the scanner to emulate an input device or terminal for the particular digital computer for which the program or other data is written. Thereafter, the program data, or other informational data, contained in the bar code is read, processed into digital signals and transmitted to the computer.

With the present invention, therefore, the recording of digital programs and other data in the form of lines of optical bar code, and the distribution of such data as individual sheets or as parts of computer magazines, becomes a particularly attractive alternative to other types of storage media such as tape cassettes and disks.

What is claimed is:

1. A system for loading prerecorded computer programs into a digital computer, the prerecorded computer program being recorded in the form of a plurality of lines of optical bar code, the plurality of lines including at least one Control Array line containing characters identifying the digital computer for which the program is written and defining a format for program data to be transmitted to the digital computer, and the plurality of lines including at least one data line containing additional characters representing the program data, the system comprising an optical bar code reader for providing an output representative of mark and space bars of the optical bar code as relative movement of the reader with respect to the optical bar code occurs, means for converting the output of the optical bar code reader for each line into digital data representative of the characters in that line, means for storing the digital data from the Control Array line as Control Array data, means for storing the digital data from the data line as program data, and means for transmitting the stored program data to the digital computer in a format based upon the stored Control Array data.

2. The system of claim 1 wherein each line begins with a predetermined start-of-line character.

3. The system of claim 2 wherein the means for converting does not begin converting the output of the optical bar code reader into digital data until the output has changed in a first predetermined manner indicative of the start-of-line character.

4. The system of claim 3 wherein each line ends with a predetermined end-of-line character.

5. The system of claim 4 wherein the means for converting discontinues further converting of the output between a time when the output changes in a second predetermined manner indicative of the end-of-line character and a time when the output changes in the first predetermined manner indicative of another start-of-line character.

6. The system of claim 1 wherein each line includes at least one character for defining a line number for that line, and wherein the system further includes means for checking the line number of each line based upon digital data from the means for converting, and means for providing a warning signal if the line number of the line does not have a predetermined relationship to preceding line numbers.

7. The system of claim 1 wherein each line includes at least one checksum character representing a value which, when summed with values of the other characters of the line, produces a predetermined value, and wherein the system further includes means for summing the digital data from the line to produce a checksum total, and means for providing a warning signal indicating the line was not read correctly if the checksum total does not equal the predetermined value.

8. The system of claim 1 wherein the Control Array data includes a transmit block length, a number of times the block is to be transmitted, a leader length, an Inter-Record Gap length, a gap content, and start, mark, space and end bit waveform times.

9. The system of claim 8 wherein the Control Array information further includes mark, space and Inter-Record Gap marks.

10. The system of claim 1 wherein the Control Array line includes function characters which identify it as a Control Array line, and wherein the data line includes function characters which identify it as a data line.

11. A system for loading information into a digital computer comprising carrier means having thereon at least one Control Array line of optical bar code and at least one data line of optical bar code, said Control Array line containing characters representing Control Array data which define a format for information data to be transmitted to the digital computer and said data line containing characters representing the information data to be transmitted, and bar code scanner means for scanning said lines of optical bar code and loading the information represented by the data line into the digital computer, the bar code scanner means including means for providing an output representative of the mark and space bars of each line, means for converting the output for each line into digital data representative of the characters in that line, means for storing the digital data from the Control Array line as the Control Array data and the digital data from the data line as the information data, and means for transmitting the stored information data to the digital computer in the format defined by the stored Control Array data.

12. The system of claim 11 wherein each of said lines begins with a predetermined start-of-line character.

13. The system of claim 12 wherein the means for converting does not begin converting the output of the optical bar code reader into digital data until the output has changed in a first predetermined manner indicative of the start-of-line character.

14. The system of claim 13 wherein each line ends with a predetermined end-of-line character.

15. The system of claim 14 wherein the means for converting discontinues further converting of the output between a time when the output changes in a second predetermined manner indicative of the end-of-line character and a time when the output changes in the first predetermined manner indicative of another start-of-line character.

16. The system of claim 11 wherein each of said lines includes at least one character for defining a line number for that line, and wherein the bar code scanner means further comprises means for checking the line number of each line based upon digital data from said converting means, and means for providing a warning signal if the line number of the line does not have a predetermined relationship to preceding line numbers.

17. The system of claim 11 wherein each line includes at least one checksum character representing a value which, when summed with values of the other characters of the line, produces a predetermined value, and where the bar code scanner means further includes means for summing the digital data from the line to produce a checksum total, and means for providing a warning signal indicating the line was not read correctly if the checksum total does not equal the predetermined value.

18. The system of claim 11 wherein the Control Array data includes a transmit block length, a number of times the block is to be transmitted, a leader length, an Inter-Record Gap length, a gap content, and start, mark, space and end bit waveform times.

19. A system for loading a computer utilizing a program and Control Array recorded on a carrier in the form of a plurality of lines of optical bar code comprising a Control Array line on the carrier containing a start-of-line character, a function byte which identifies the Control Array line, a machine type byte which identifies a computer for which the program is written, a plurality of bytes which define a format for program data to be transferred to the computers, a checksum byte which, when summed with other bytes of the Control Array line, yields a predetermined value, and an end-of-line character, the carrier further including thereon at least one data line containing a start-of-line character, a line number byte, a function byte which identifies the data line, a plurality of data bytes which represent the program data, a checksum byte which, when summed with other bytes of the data line, yields the predetermined value, and an end-of-line character.

* * * * *